United States Patent [19]

Denson, Sr.

[11] 4,254,622
[45] Mar. 10, 1981

[54] HYDRODYNAMIC GRAVITY MOTOR

[76] Inventor: Jack G. Denson, Sr., 1306 Landon St., Stamford, Tex. 79553

[21] Appl. No.: 50,311

[22] Filed: Jun. 20, 1979

Related U.S. Application Data

[62] Division of Ser. No. 857,510, Dec. 5, 1977, abandoned.

[51] Int. Cl.$^3$ .............................................. F03B 17/02
[52] U.S. Cl. ....................................................... 60/496
[58] Field of Search ......................... 60/495, 496, 721; 221/297, 301; 114/323–325

[56] References Cited

U.S. PATENT DOCUMENTS

| | | | |
|---|---|---|---|
| 1,708,807 | 4/1929 | Tatay | 415/DIG. 2 X |
| 2,037,973 | 4/1936 | Grondahl | 60/496 |
| 3,194,008 | 7/1965 | Baumgartner | 60/495 |
| 3,292,365 | 12/1966 | McCoin | 60/495 X |
| 3,857,242 | 12/1974 | Gilmore | 60/495 |
| 3,934,964 | 1/1976 | Diamond | 60/495 X |

FOREIGN PATENT DOCUMENTS 1117432 11/1961 Fed. Rep. of Germany ........... 114/323
369805 3/1932 United Kingdom .................... 114/325

Primary Examiner—Allen M. Ostrager
Assistant Examiner—Stephen F. Husar

[57] ABSTRACT

The specification discloses a hydrodynamic gravity motor for use in converting gravitational and buoyant forces into useful energy. A plurality of hollow vessels are attached between a pair of endless power chains. The power chains define a closed path of movement for the vessels moving by buoyant forces upward through a reservoir holding a column of liquid and returning downward outside of the reservoir from the gravitational forces on the vessels. A radial gate valve is disposed at the bottom of the reservoir for admitting each of the hollow vessels into the reservoir. The radial gate valve has a pair of lower panels operating in sequence with a pair of upper panels for defining a chamber for receiving each of the vessels. The radial gate valve has a plurality of buoyant lift tanks attached to the upper panels for reducing the force necessary to open the gate. Flap valves are provided in the upper panels of the gate valve for admitting a quantity of liquid into the chamber for providing an initial buoyant force to the vessel.

6 Claims, 5 Drawing Figures

HYDRODYNAMIC GRAVITY MOTOR

This is a division of application Ser. No. 857,510 filed Dec. 5, 1977, now abandoned.

FIELD OF THE INVENTION

This invention relates to hydrodynamic gravity motors, more particularly relating to a hydrodynamic gravity motor having a radial gate valve having a plurality of buoyant lift tanks for reducing the hydraulic pressure on the gate valve when the valve is admitting hollow vessels into a reservoir filled with a liquid.

DESCRIPTION OF THE PRIOR ART

It has long been known that an unlimited supply of clean energy is obtainable from harnessing the buoyant forces exerted on a closed vessel. A power generator utilizing such buoyant forces is often used in conjunction with harnessing the gravitational forces exerted on such closed vessels after they have left the environment in which they are subjected to buoyant forces. Typical power generators utilizing such buoyant and gravitational forces include a conveyor for carrying a plurality of closed vessels upward through a column of liquid because of the uplifting buoyant forces and carrying the vessels downward outside of a container defining the column of liquid because of the gravitational forces.

While power generators utilizing buoyant and gravitational forces have many advantages, such power systems have been limited by the inefficient method of transferring the closed vessels from one medium to another. Some power systems have transferred the closed vessels from one medium to another by using a ram to shift the vessel from one conveyor to another. Such a method of transferring closed vessels requires an external source of power to operate the ramming mechanisms, which reduces the overall efficiency of the system. Other power systems have utilized a chamber for reducing the hydraulic pressure exerted on successive vessels entering the column of water. Still other power systems have attempted to solve the problem of transferring the vessels by eliminating the endless chain or conveyor carrying the bodies and providing a closed pressurized system for defining a path of travel for the vessels.

The hydrodynamic gravity motor of the present invention overcomes the above noted disadvantages associated with such prior art systems by utilizing a radial gate valve disposed at the bottom of a reservoir defining the vertical column of liquid for the buoyant closed vessels. The radial gate valve includes buoyant lift tanks attached to upper panels of the valve for counterbalancing the hydraulic pressure exerted on such panels. Lower panels of the gate operate in sequence with the upper panel members to admit successive ones of the buoyant bodies through the gate into the reservoir. The upper and lower panel members of the gate operate in sequence to define a chamber for admitting liquid from the reservoir to provide an initial buoyant lift to the closed vessel.

SUMMARY OF THE INVENTION

The present invention presents an improved hydrodynamic gravity motor which overcomes the problems associated with such prior art devices. The hydrodynamic gravity motor of the present invention includes an improved method for transferring the buoyant closed vessels used in such motors from one medium to another.

In accordance with the present invention, a hydrodynamic gravity motor for use in converting gravitational and buoyant forces into useful energy has a reservoir for holding a column of liquid. A plurality of hollow vessels attached to endless chains move vertically upward through the column of liquid and vertically downward outside of the reservoir. The vessels move upward through the liquid by the positive buoyant forces of the displaced liquid and downward by gravitational forces. Gate means are provided for admitting successive ones of the hollow vessels into the reservoir, where the gate means includes buoyant vessels submerged within the liquid for counterbalancing the hydraulic pressure of the liquid upon the gate means.

In accordance with another aspect of the invention, a radial gate valve is provided for admitting successive ones of the hollow vessels into the liquid filled reservoir. The radial gate valve includes two upper panel members having one edge hinged to a wall of the reservoir for rotation between the open and close positions. The other edge of said panel members distal from said hinged edge engage one another in the close position and move radially into the reservoir in the open position. Two retractable lower panel members have one edge attached to the upper panel members for movement between the open and close positions. The upper and lower panel members define a chamber for receiving successive ones of the hollow vessels. Finally, valve means are provided for admitting a quantity of liquid into the chamber defined by the upper and lower panel members in response to one of the vessels entering the chamber. The liquid surrounding the vessel entering the chamber provides an initial upward buoyant force for the vessel entering the reservoir.

BRIEF DESCRIPTION OF THE DRAWINGS

For a more complete understanding of the present invention and further objects and advantages thereof, reference is now made to the following description taken in conjunction with the following drawings.

DESCRIPTION OF THE PREFERRED EMBODIMENT

Figure 1:
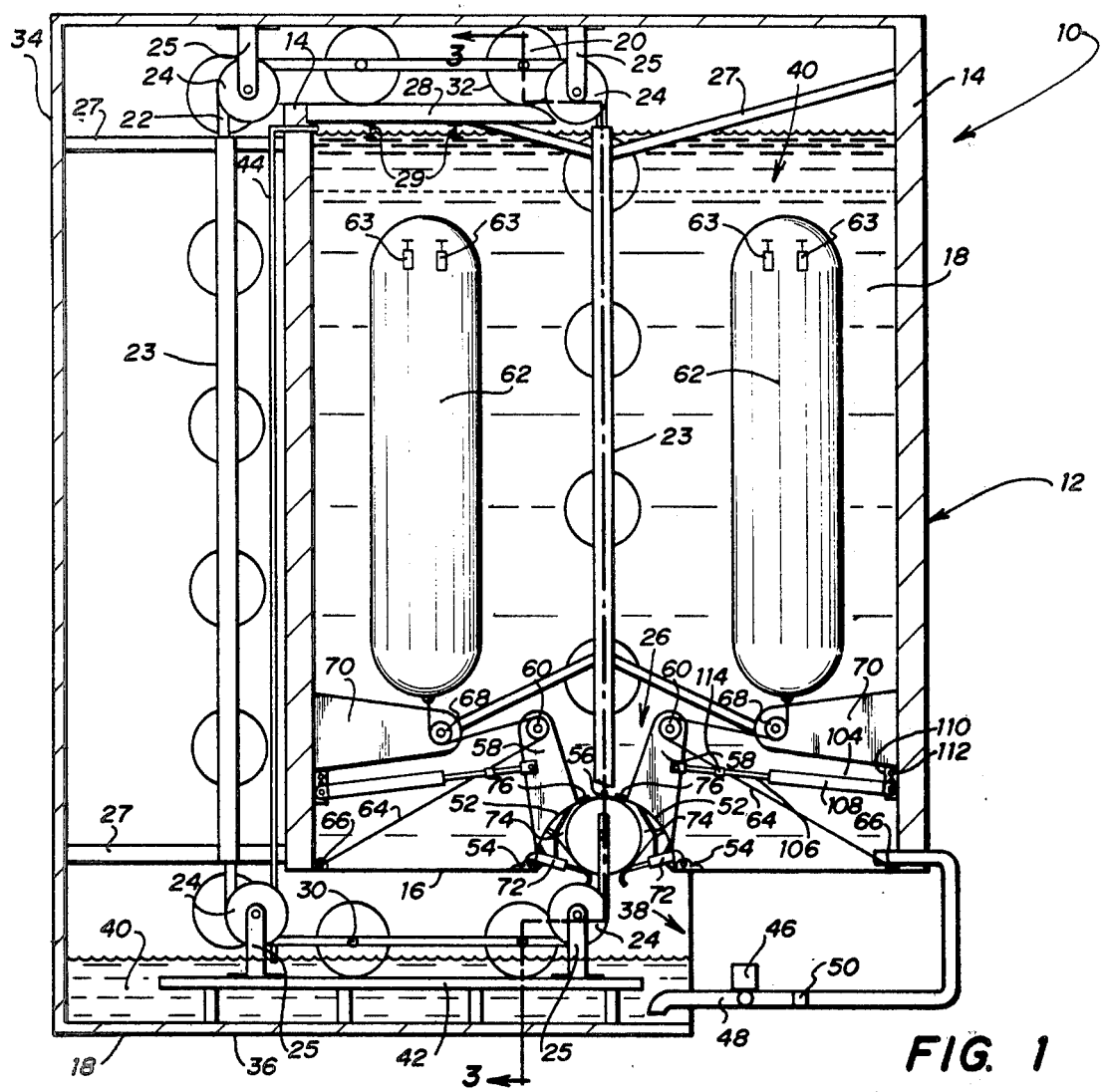
FIG. 1 is a side view of the preferred embodiment of the present invention.

FIG. 1 is a side view of the preferred embodiment of the hydrodynamic gravity motor of the present invention, generally identified by the reference numeral 10. An open-topped reservoir 12 is formed by vertical side walls 14 and bottom wall 16 for receiving therein a quantity of liquid 18. Water could be used as the liquid 18 because it is inexpensive and readily available, but of course other liquids could be used instead of water.

A plurality of closed vessels 20 are secured between a pair of endless power chains 22 supported for rotation upon a plurality of cogwheels 24. The closed vessels 20 are attached to endless power chains 22 by a bearing assembly 30 to provide for rotational movement of the closed vessel 20 about the chains 22. The endless power chains 22 move within channel guides 23 located within the reservoir 12 and a vertical descending tank 34. The channel guides 23 within reservoir 12 include fluid seals (not shown) for engaging the chains 22 and rubber water seals (not shown) for engaging the bearing assemblies 30 of the vessels 20. The channel guides 23 are supported by channel guide braces 27. The cogwheels 24 define the closed path of rotation of the vessels 20 in the direction indicated by the arrows shown in FIG. 1. The vessels 20 move vertically upward through the liquid 18 by the buoyant force of the liquid 18 displaced by the vessles 20. The vessels 20 then move downward as they fall under the influence of gravity outside of the reservoir 12 in the vertical descending tank 34. The cogwheels 24 are supported for rotation by supports 25.

The closed vessels 20 are admitted through the radial gate valve 26 located along the bottom wall 16 of the reservoir 12. A closed vessel 20 entering the reservoir 12 through gate valve 26 is carried vertically upward by the positive buoyant forces. The vessel 20 continues to rise from the bottom of the reservoir 12 through the column of liquid 18, exiting from the reservoir 12. Power chains 22 transfer the vertical path of rotation to a horizontal direction across the top of the reservoir 12. Upper support rails 28 are attached to the side wall 14 of the reservoir 12 and supported by beams 29 for supporting the weight of the closed vessels 20. The cylindrical side walls 32 of the closed vessels 20 roll across the upper support rails 28 until a second cogwheel 24 located beyond the side wall 14 transfers the horizontal movement of the vessels 20 and power chains 22 to the vertical direction.

Following the horizontal movement of the closed vessels 20 across the upper support rails 28, a cogwheel 24 transfers the closed vessels 20 into a vertical descending tank 34. The vertical descending tank 34 has a bottom wall 36 and a side wall 38 located beneath the bottom wall 16 of the reservoir 12 for maintaining a level of lubricating fluid 40 within the bottom of the descending tank 34. In vertical descending tank 34, the closed vessels 20 drop vertically downward under the forces of gravity until the path of rotation is again changed to the horizontal direction by a cogwheel 24 located beneath the bottom wall 16 of the reservoir 12. A lower support rail assembly 42 is secured to the bottom wall 36 of the tank 34 for supporting the closed vessels 20 moving in a horizontal direction beneath the bottom of the reservoir 12.

A lubricating fluid 40 is maintained at a level above the lower support rail 42 for reducing the rolling friction between the rotating closed vessels 20 and the lower support rails 42. In addition, the luricating fluid 40 coats the cylindrical side walls 32 of the vessels 20 to facilitate their passage through the radial gate valve 26. A cogwheel 24 disposed below the bottom of the gate valve 26 transfers the horizontal movement of the closed vessel 20 and power chains 22 to the vertical direction for movement upward through the gate valve 26.

In addition to the lubricating fluid 40 in the bottom of the descending tank 34, a quantity of lubricating fluid 40, having a specific density less than that of the liquid 18, floats at the top of the reservoir 12. The lubricating fluid 40 lubricates the closed vessels 20 and the power chains 22 exiting from the liquid 18 and reduces the rolling friction between the cylindrical side walls 32 and the upper support rail 28. An overflow line 44 is located within the side wall 14 of the reservoir 12 for channeling any lubricating fluid 40 overflowing the reservoir 12 into the lubricating fluid 40 within the descending tank 34. Similarly, any liquid 18 which is lost from the reservoir 12 when the gate valve 26 opens to admit a closed vessel 20 is returned by a sump pump 46 located beneath the gate valve 26. Since the liquid 18 has a specific density greater than that of the lubricating fluid 40, it drops to the bottom wall 36 of the tank 34 and is returned through piping 48 by sump pump 46 to the reservoir 12. A check valve assembly 50 is provided in the piping 48 to prevent the liquid 18 from being forced from hydraulic pressure in reservoir 12 through the piping 48.

The radial gate valve 26 includes a pair of upper gate panels 52. Each panel 52 is attached by a hinge assembly 54 to the bottom wall 16 of the reservoir 12. In the closed position illustrated in FIG. 1, the upper gate panels 52 have fluid seals 56 along the adjoining edges for preventing liquid 18 from escaping from the reservoir. Each of the upper gate panels 52 has a plurality of gate arms 58 extending therefrom for opening and closing the valve 26, and each of the gate arms 58 has a sheave 60 attached thereto for operating gate valve 26. Buoyant gate lift tanks 62 are submerged within the liquid 18 and held in position by steel cables 64 secured to the bottom wall 16 of the reservoir 12 by anchor plate 66. The positive buoyant lift forces created by lift tanks 62 are transferred to the gate arms 58 of the gate valve 26 through a sheave 68 attached to a support arm 70 extending from the side walls 14 and the sheaves 60 attached to the gate arms 58. By this arrangement of the sheaves 60 and 68, the upward vertical force from lift tanks 62 provides a force countering the hydraulic pressure on the valves 26 for reducing the energy loss associated with separating the upper gate panels 52 of gate valve 26.

The buoyant lift tanks 62 exert an upward buoyant force from the volume of liquid 18 displaced by the volume of the lift tanks 62. In this manner, the force a closed vessel 20 must exert on the upper panel 52 of valve 26 is reduced to increase the efficiency of the operation of the hydrodynamic gravity motor 10. A plurality of gate valves 63 are located at the top of each lift tank 62 to adjust the level of the tank 62 in the liquid 18 by adjusting the weight of the tank 62.

A telescoping gate control ram 104 is attached between each of the gate arms 58 and the side wall 14 to set a stop position for the movement of the gate panels 52. The ram 104 may be either spring loaded or hydraulic and includes a telescoping arm 106 attached to gate arm 58 and received within a sleeve member 108. The sleeve member 108 is adjustably positioned along the apertures 112 formed within an anchor plate 110, the plate 110 being attached to the side wall 14. Finally, a locking clamp 114 is adjustably positioned along the arm 106 to limit the travel of the panels 52.

Figure 4:
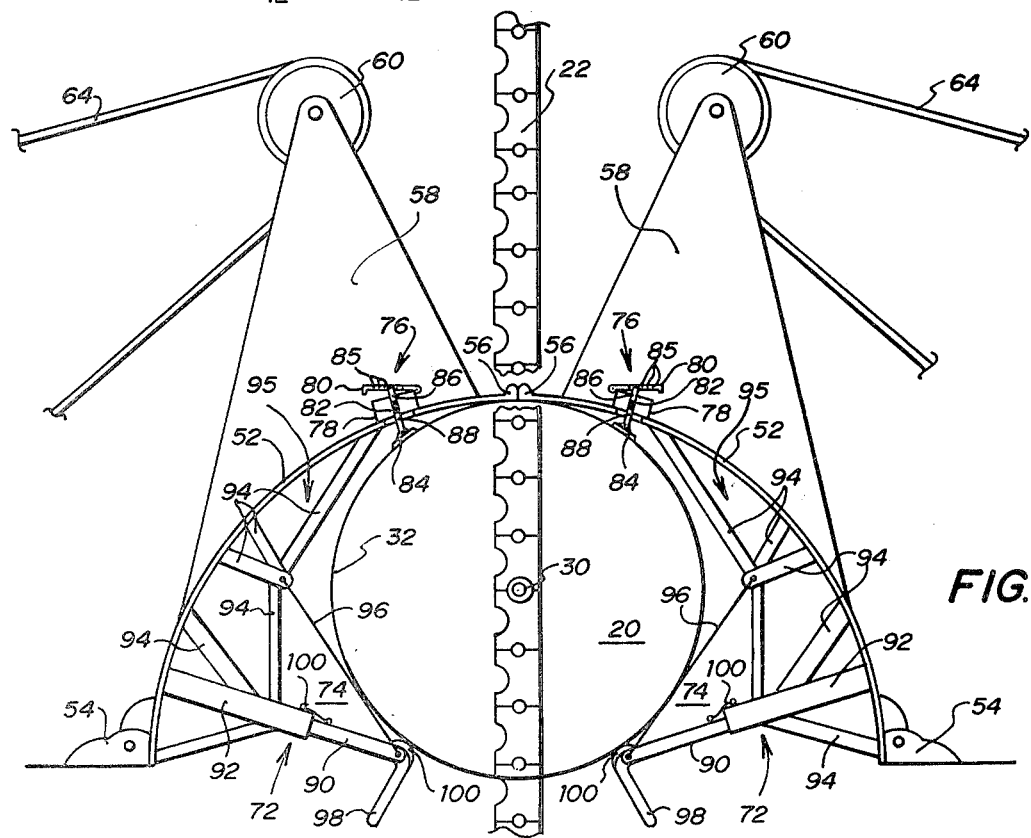
FIG. 4 is a side view of the preferred embodiment of the radial gate valve.

A telescoping lower arm 72 is attached to each of the upper gate panels 52 for defining a chamber 74 for receiving each closed vessel 20 successively admitted to the reservoir 12. The chamber 74 extends to a buoyant gate chamber 95 formed within each gate panel 52 as illustrated in FIG. 4 and described further hereinbelow. In addition, flap valves 76 are located along the top side of upper gate panels 52 for admitting the liquid 18 into the chamber 74 when a closed vessel 20 enters the chamber 74. Thus, the liquid 18 fills the chamber 74 and surrounds a closed vessel 20, providing a positive upward buoyant force for separating the upper gate panels 52 for admitting a vessel 20 into the reservoir 12. As the buoyant lift tanks 62 rise upon separation of the upper gate panels 52, the tanks 62 enter into the lubricating fluid 40. Since the lubricating fluid 40 has a lower specific density than that of the liquid 18, the buoyant force exerted upon the tanks 62 decreases, allowing for easier closing of the upper gate panels 52 after a closed vessel 20 passes into the reservoir 12.

Figure 2:
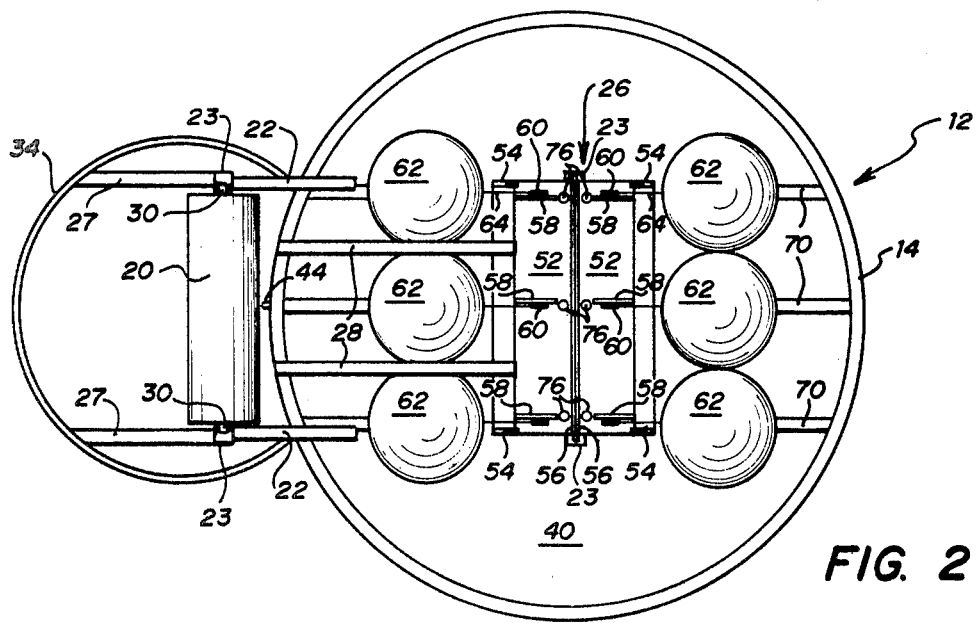
FIG. 2 is a plan view of the preferred embodiment of the present invention.

FIG. 2 is a plan view of the preferred embodiment of the hydrodynamic gravity motor 10. The reservoir 12 has vertical side walls 14 for retaining the vertical column of liquid 18, including the upper level of lubricating fluid 40. It is to be understood, of course, that the reservoir 12 may have any desired configuration other than that illustrated in FIG. 2. In addition, it is understood that the dimensions of the reservoir 12 and the hydraulic pressure of the liquid 18 exerted upon the side walls 14 may require additional bracing to support the side walls 14.

FIG. 2 illustrates the upper gate panels 52, including opposing fluid seals 56 and flap valves 76. A plurality of buoyant lift tanks 62 associated with each upper gate panel 52 are shown attached together for providing the desired positive buoyancy force for counterbalancing the hydraulic pressure on the gate panels 52 from the column of liquid 18. Of course, any desired number of buoyant lift tanks 62 may be used in any configuration to provide the desired counterbalancing positive buoyancy force. The upper gate panels 52 are connected to lift tanks 62 through gate arms 58, sheave 60 and cable 64.

The upper support rails 28 are shown attached to the said wall 14 of the reservoir 12 for supporting the closed vessels 20 moving horizontally across the top of the reservoir 12. A closed vessel 20 is illustrated in FIG. 2 as it enters the vertical descending tank 34 after clearing the upper support rails 28. The closed vessel 20 is secured for rotation by bearing assembly 30 to endless power chains 22, advancing the power chains 22 through the channel guides 23 as the closed vessels 20 drop through the vertical descending tank 34 under the action of gravity.

Figure 3:
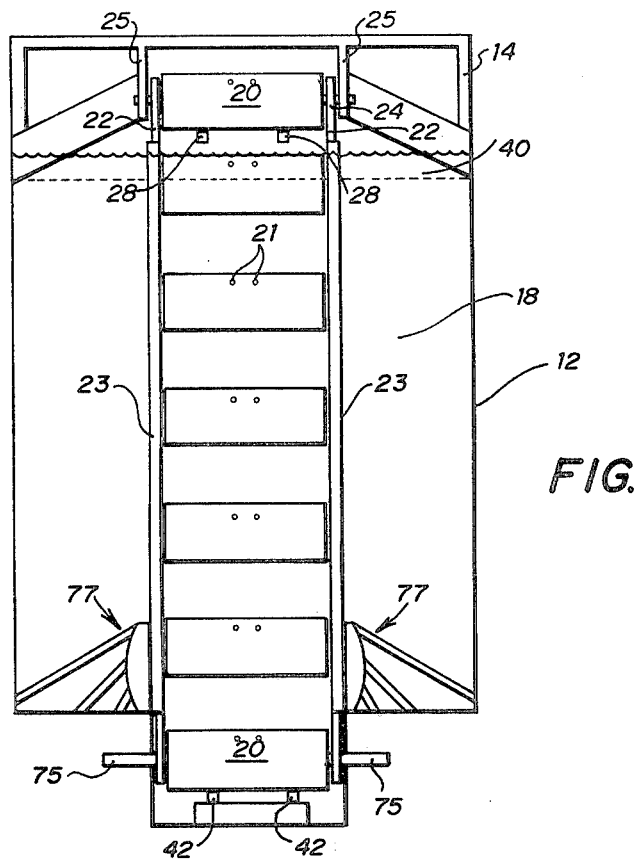
FIG. 3 is sectional view of the preferred embodiment of the present invention taken along the line 3—3.

FIG. 3 is a sectional view of the closed vessels 20 ascending through the liquid 18 of reservoir 12. The vessels 20 move horizontally along the lower support rails 42 and are then directed upward through the liquid 18. Vessels 20 exiting the reservoir 12 are then carried along horizontally by the upper support rails 28. Vessels 20 included flush mounted plugs 21 for adding fluid, gas or for servicing. A power shaft 75 is shown attached to cogwheel 24 above lower support rails 42 for harnessing the energy derived from the motor 10. In addition, bulkheads 77 support ends of radial gate valve 26 (shown in FIG. 1) and provide a fluid seal between the end of radial gate valve 26 and the inner side walls of bulkheads 77.

FIG. 4 is a detailed cross sectional view of the radial gate valve 26 illustrated in FIG. 1. The flap valves 76 include open cylindrical members 78 formed in the upper panels 52 and a cover panel 80 covering members 78 for opening and closing the flap valve 76. Flap valve 76 is opened by the adjustable plunger 82 and its base member 84 engaging the cylindrical side walls 32 of vessels 20. The base member 84 is pivotally attached to the plunger 82. The cover panel 80 includes opening 85 formed in cover panel 80 for adjustably attaching the plunger 82 to cover panel 80. The adjustable plunger 82 includes an upper piston member 86 threadedly received within a lower sleeve member 88. Thus, the length of adjustable plunger 82 may be set by turning the lower sleeve member 88 with respect to the upper piston 86.

The telescoping lower panel 72 includes an inside sliding panel 90 mounted for movement within a fixed rigid outside panel 92. The panel members 92 are attached to the inside of upper gate panels 52 and supported by bracing members 94. The bracing within upper panel 52 also forms a buoyant gate chamber 95 for reducing the force necessary to open the gate valve 26. A supporting cable 96 extends from the end of inside panel 90 and is attached to one of the bracing members 94. An angled bumper 98 is attached to the end of inside panel 90 for engaging the cylindrical wall 32 of the vessel 20, when the inside panel 90 is in the closed position. Fluid seals 100 are attached to the upper surface of the end of inside panel 90 and along the region where panel 90 slides within panel 92, thereby providing a seal to reduce water loss from chamber 74.

In operation, the inside panel 90 of gate valve 26 is closed until a closed vessel 20 first engages the angled bumpers 98 of the lower telescoping panels 72. The upward vertical movement of the vessel 20 forces the inside panel 90 to slide back into the outside panel 92 to admit the vessel 20 into the empty chamber 74. When the vessel 20 has passed its widest portion at the midpoing of the vessel 20, the panels 90 begin to slide forward again, engaging the cylindrical side walls 32 at fluid seals 100 to provide a fluid tight chamber 74. The panels 90 move to the closed position to enclose the vessel 20 in the chamber 74.

As the vessel 20 continues to rise vertically within the chamber 74 by upward movement of power chains 22, it engages the lower base member 84 of the adjustable plunger 82 to open the flap valve 76 and to admit the liquid 18 into the chamber 74. The liquid 18 completely fills the chamber 74 and provides an initial buoyant force to the vessel 20 entering the reservoir 12. The vessel 20 continues to be moved upward by the power chains 22 which are kept in motion by the vessels 20 falling under the force of gravity through descending tank 34 and by the positive buoyant forces exerted on the vessels 20 which are submerged in reservoir 12. The vessels 20 move upward and force the upper gate panels 52 to separate as fluid seals 56 sealingly engage the cylindrical side walls 32 of the vessel 20, reducing the amount of liquid 18 escaping from the reservoir 12. Some liquid 18 will be lost from chamber 74, but this liquid 18 is returned to the reservoir 12 by the sump pump 46, illustrated in FIG. 1. The buoyant lift tanks 62 illustrated in FIG. 1 reduce the hydraulic pressure exerted by the column of liquid 18 above the upper panels 52, reducing the energy lost by the closed vessel 20 opening the gate valve 26. In addition, the buoyant gate chambers 95 inside the panels 52 reduce the energy needed to open the gate valve 26.

Figure 5:
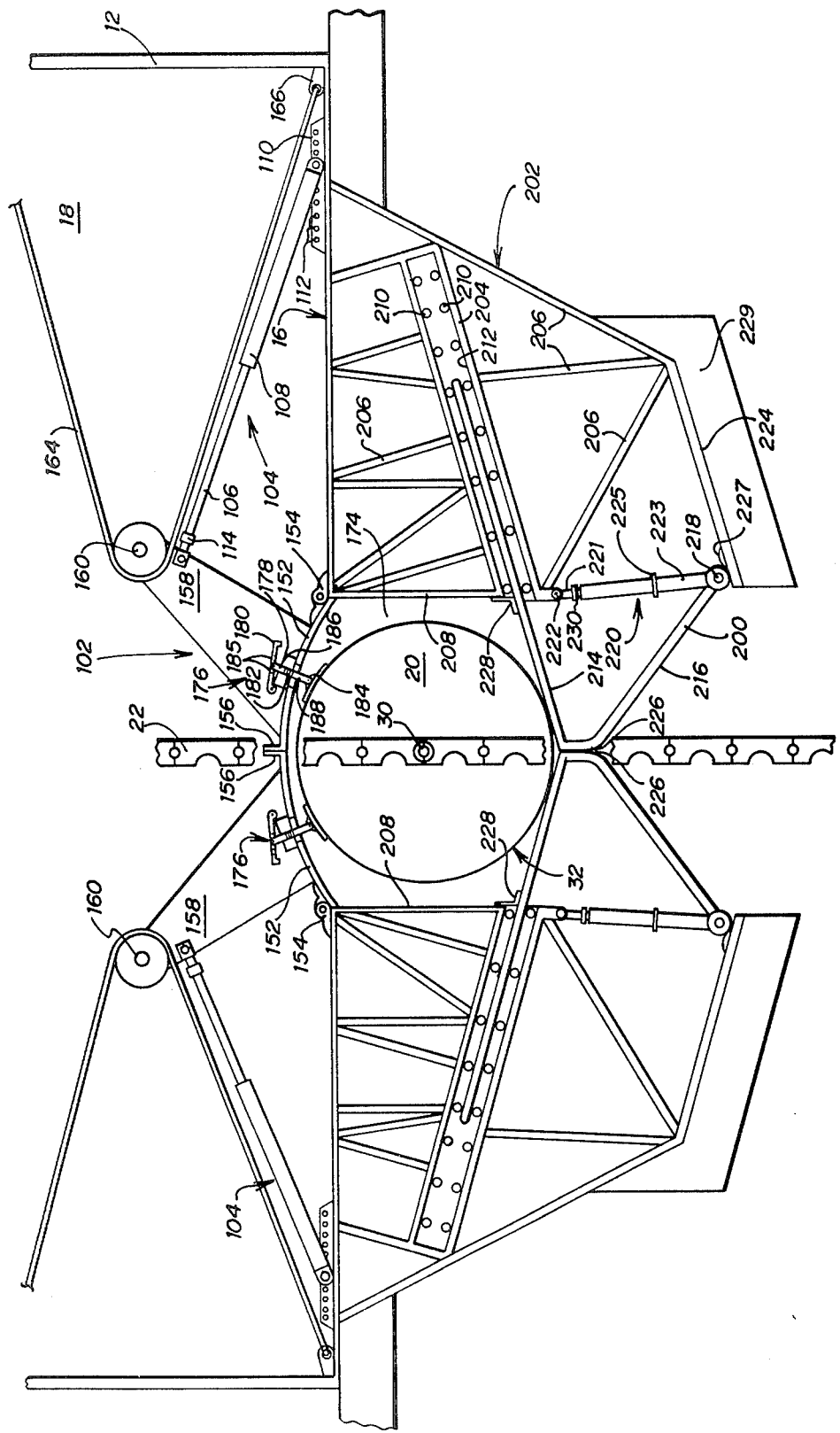
FIG. 5 is an alternate embodiment of the radial gate of the present invention.

FIG. 5 illustrates a detailed cross sectional view of an alternate radial gate valve 102. The radial gate valve assembly 26 may be characterized as a high speed high water loss valve assembly, whereas the alternate radial gate valve 102 may be characterized as a low speed low water loss valve assembly.

The alternate gate valve 102 is located at the bottom wall 16 of the reservoir 12. A pair of upper panels 152 rotate upon hinges 154 for movement between the open and close position. In the closed position illustrated in FIG. 5, the upper closure panels 152 sealingly engage one another along fluid seals 156 to prevent the liquid 18 from escaping the reservoir 12. An upper gate arm 158 is attached to each of the upper closure panels 152 for moving the panels 152 between the open and closed position. The gate arms 158 include sheaves 160 attached to the distal end for receiving steel cables 164 for operating the upper closure panels 152. The steel cables 164 are secured by an anchor plate 166 to the bottom wall 16 of the reservoir 12 and are attached to the bottom of buoyant gate lift tanks 62 (not shown) for counterbalancing the hydraulic pressure upon the upper closure panels 152.

A telescoping gate control ram 104 is attached between the bottom wall 16 and each gate arm 158 to set a stop position for the movement of gate panels 152. The ram 104 may be either spring loaded or hydraulic and includes a telescoping arm 106 attached to gate arm 158 and received within a sleeve member 108. The sleeve member is adjustably positioned along the apertures 112 of an anchor plate 110, the plate 110 being attached to the bottom wall 16. Finally, a locking clamp 114 is adjustably positioned along the arm 106 to limit the travel of the panels 152.

The upper closure panels 152 include flap valves 176 for admitting the liquid 18 into the chamber 174 when a closed vessel 20 is passing from the gate valve assembly 102 into the reservoir 12. The flap valve assembly 176 includes the cylindrical members 178 sealed by the cover panels 180, where the cover panels 180 are operated by adjustable plungers 182. The adjustable plunger 182 has an upper piston member 186 threadably received within a lower sleeve member 188 for adjusting the length of the plunger 182. The adjustable plunger 182 may be selectively attached to openings 185 for adjusting the angle plunger 182 is attached to the cover panel 180. In addition, a base member 184 is pivotally secured to the end of the adjustable plunger 182 remote from panel 180 for engaging the cylindrical walls 32 of a closed vessel 20. The flap valves 176 operate in response to the pressure exerted against the base member 184 for opening the flap valve 176 and admitting the liquid 18 into the chamber 174.

The alternate radial gate valve 102 includes a pair of lower closure panels 200 mounted for movement within support assembly 202. The support assembly 202 includes an inclined upper channel member 204 supported by bracing 206 to the bottom wall 16 of reservoir 12. The bracing 206 for the channel 204 includes side walls 208 forming the sides of the gate valve assembly 102. The inclined upper channel member 204 includes rollers 210 mounted on the interior walls of channel 204 for receiving the upper panel 214 of the lower closure assembly 200.

The lower closure panel assembly 200 includes a lower supporting arm 216 rigidly attached to the upper panel at the distal end of upper panel 214. The lower supporting arm 216 extends to a wheel assembly 218 which supports a telescoping arm 220, including a slider member 221 and a sleeve 223. The slider 221 is hinged at the end distal from the wheel assembly 218 to the inclined channel member 204, and slider 221 is limited in its movement within sleeve 223 by lock pin 225. The wheel assembly 218 is supported upon the lower angled rail 224 which defines a path of movement for the wheel assembly 218. A leaf spring 227 is provided along rail 224 to prevent separation of the lower arms 216 until a vessel 20 forces the lower arms 216 apart. The lower rail 224 is supported upon a reinforced concrete pad 229 for supporting the entire assembly 202.

Fluid seals 226 are attached to the opposing faces of arms 216 for providing a fluid-tight seal on the lower closure panels 200 adjoining one another in a closed position, as illustrated in FIG. 5. In addition, fluid seals 228 are included where upper panel 214 slides within channel 204 to provide a watertight seal.

In operation of alternate gate valve 102, a vessel 20 is moved upward by the endless power chains 22 into engagement with the lower arms 216 of the gate valve 102. The upward movement of the vessel 20 causes the lower closure panels 200 to separate, forcing the upper panel 214 within the channel member 204. The lower arm 216 causes the wheel assembly 218 to move upward along the rail 224 past the leaf spring 227. When vessel 20 is in this position it has released what fluid that is in chamber 174 to bottom of descending tank 34 (shown in FIG. 1).

The lower closure panels 200 completely close after the vessel 20 has advanced within the gave valve 102, as illustrated in FIG. 5. As vessel 20 continues to rise within the gate valve 102, it engages the base members 184 for opening the flap valves 176. The liquid 18 enters the closed gate valve 102 to provide an additional upward buoyant force to the vessel 20 prior to its entry into the reservoir 12. The vessel 20 continues to rise through the gate valve 102 causing the upper gate panels 152 to separate, admitting the vessel 20 into the reservoir 12. This process is repeated for each vessel 20 entering the reservoir 12.

It will be understood that the hydrodynamic motor 10 of the present invention may be constructed using any suitable material found but preferably made from metal to withstand the stresses occurring during operation. It will be further understood that the closed vessels 20 may vary in size and shape, as may the buoyant lift tanks 62.

Although preferred embodiments of the invention have been illustrated in the accompanying drawings and described in the foregoing detailed description, it will be understood that the invention is not limited to the embodiments disclosed; they are capable of numerous rearrangements, modifications and substitution of parts and elements without departing from the spirit of the invention.

What is claimed is:

1. A radial gate valve assembly for use in a hydrodynamic gravity motor for admitting successive ones of a plurality of closed vessels into a reservoir holding a vertical column of liquid, comprising:

two normally closed arcuate upper radial gate panels hinged at one edge to the bottom wall of the reservoir for movement between the normally closed and an open position, including side walls formed on the ends of each of said arcuate upper panels;

two normally closed retractable lower panel members extending upwardly from said upper panel members, such that a chamber is defined between said upper and lower panels and said side walls for receiving successive ones of said closed vessels;

said upper and lower panel members operating in sequence, such that said lower panel members first retract to open and sdmit one of said closed vessels, said lower panel members returning to the normally closed position before said normally closed upper panel members open to admit said closed vessel to the reservoir; and valve means operating in response to one of said closed vessels entering said chamber defined by said upper and lower panel members for introducing liquid from the reservoir into the chamber, such that an initial upward buoyant force is provided to said closed vessel.

2. The radial gate valve assembly of claim 1 and further comprising:

a plurality of buoyant lift tanks submerged within the reservoir and attached to said normally closed upper panels for counterbalancing the hydraulic pressure of the liquid within the reservoir upon said panels.

3. The radial gate valve assembly of claim 2, wherein said buoyant lift tanks include gate valves for adjusting the buoyant lift force provided to said upper panels.

4. The radial gate valve assembly of claim 1, wherein said valve means comprises flap valves located upon said upper panels, said flap valves being adjustable to control the quantity of liquid introduced into the chamber formed by said upper arcuate panels, said lower panels, and said side walls.

5. A radial gate valve assembly for use in a hydrodynamic gravity motor for admitting successive ones of closed vessels to a reservoir containing a column of liquid, comprising:

two normally closed upper panel members having one edge hinged to the bottom wall of the reservoir, such that said panels open radially into said reservoir in the open position for admitting successive ones of said vessels;

each of said upper panel members including side panel members;

side walls extending from the bottom of said reservoir beneath said upper panel members;

two normally closed retractable lower panel members supported upon a foundation beneath the bottom wall of the reservoir for engaging said side walls and defining a chamber between said upper panel member, said side panel members, said side walls and said lower panel members for receiving said vessels, said normally closed lower panel members operating in balanced sequence with said upper panel members, such that said lower anel members open to admit one of said vessels and return to the normally closed position before said upper panel members open; and valve means operating in response to a vessel in said chamber for introducing a quantity of liquid into said chamber for providing an initial upward buoyant force to the vessel exiting said valve assembly.

6. The radial gate valve assembly of claim 5, and further comprising:

bracing extending from the bottom wall of the reservoir, said bracing supporting a sleeve member for receiving each of said retractable lower panel members in the open position.

* * * * *

UNITED STATES PATENT AND TRADEMARK OFFICE
CERTIFICATE OF CORRECTION

PATENT NO. : 4,254,622
DATED : March 10, 1981
INVENTOR(S) : Jack G. Denson, Sr.

It is certified that error appears in the above-identified patent and that said Letters Patent are hereby corrected as shown below:

Col. 3, line 13, "vessles" should be --vessels--.
Col. 5, line 66, "opening" should be --openings--.
Col. 6, lines 28-29, "midpoing" should be --midpoint--.
Col. 8, line 21, "gave" should be --gate--;
      line 58, "upwardly" should be --inwardly--;
      line 64, "sdmit" should be --admit--.
Col. 10, line 15, "anel" should be --panel--.

Signed and Sealed this

Fourteenth Day of July 1981

[SEAL]

Attest:

GERALD J. MOSSINGHOFF

Attesting Officer     Commissioner of Patents and Trademarks